Figure 1:
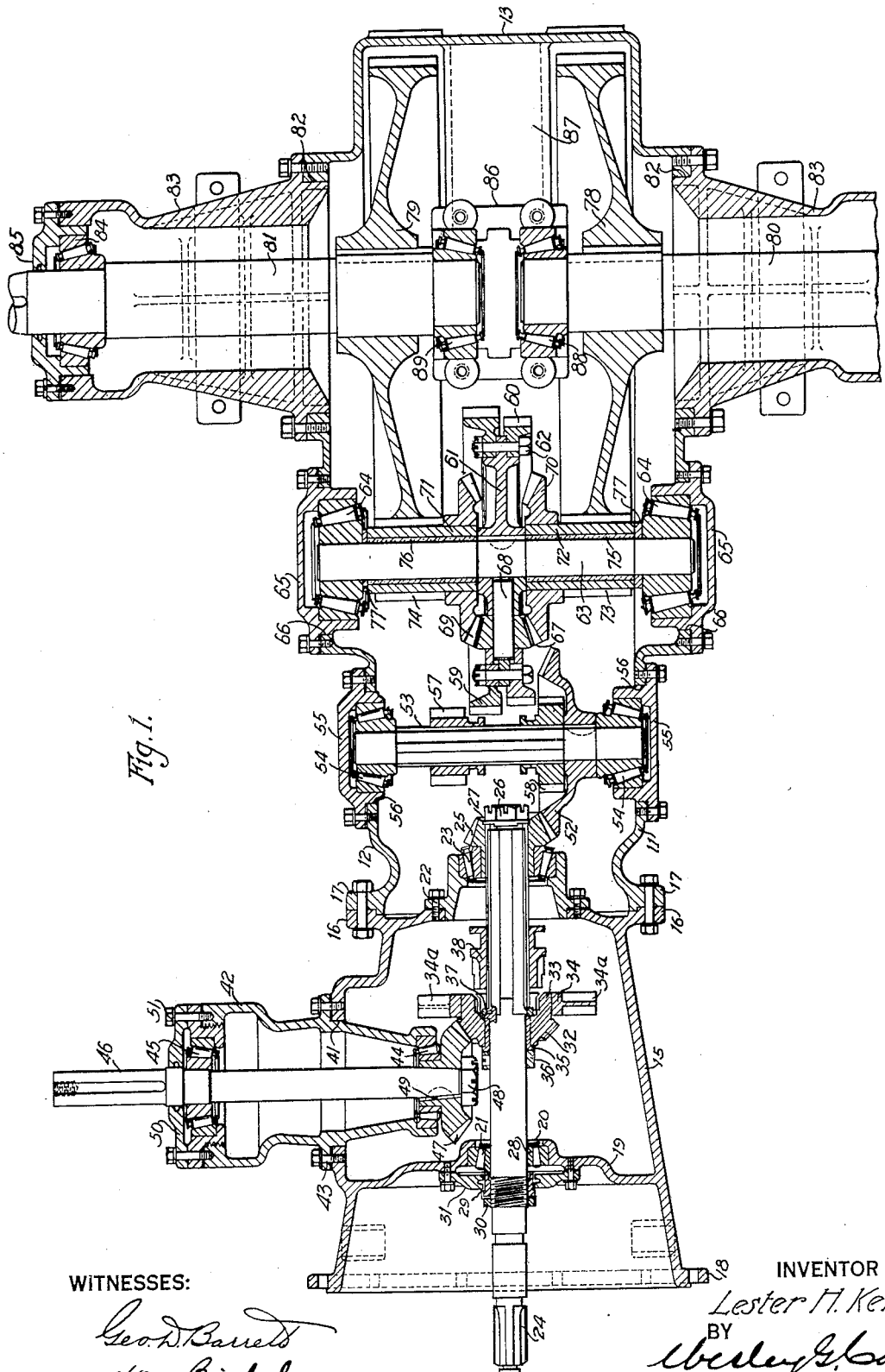

Sept. 2, 1924.

L. H. KEIM 1,506,755

TRANSMISSION MECHANISM

Filed July 15, 1919

2 Sheets-Sheet 1

WITNESSES:
Geo. D. Barrett
H. M. Biebel

INVENTOR
Lester H. Keim.
BY
Wesley G. Carr
ATTORNEY

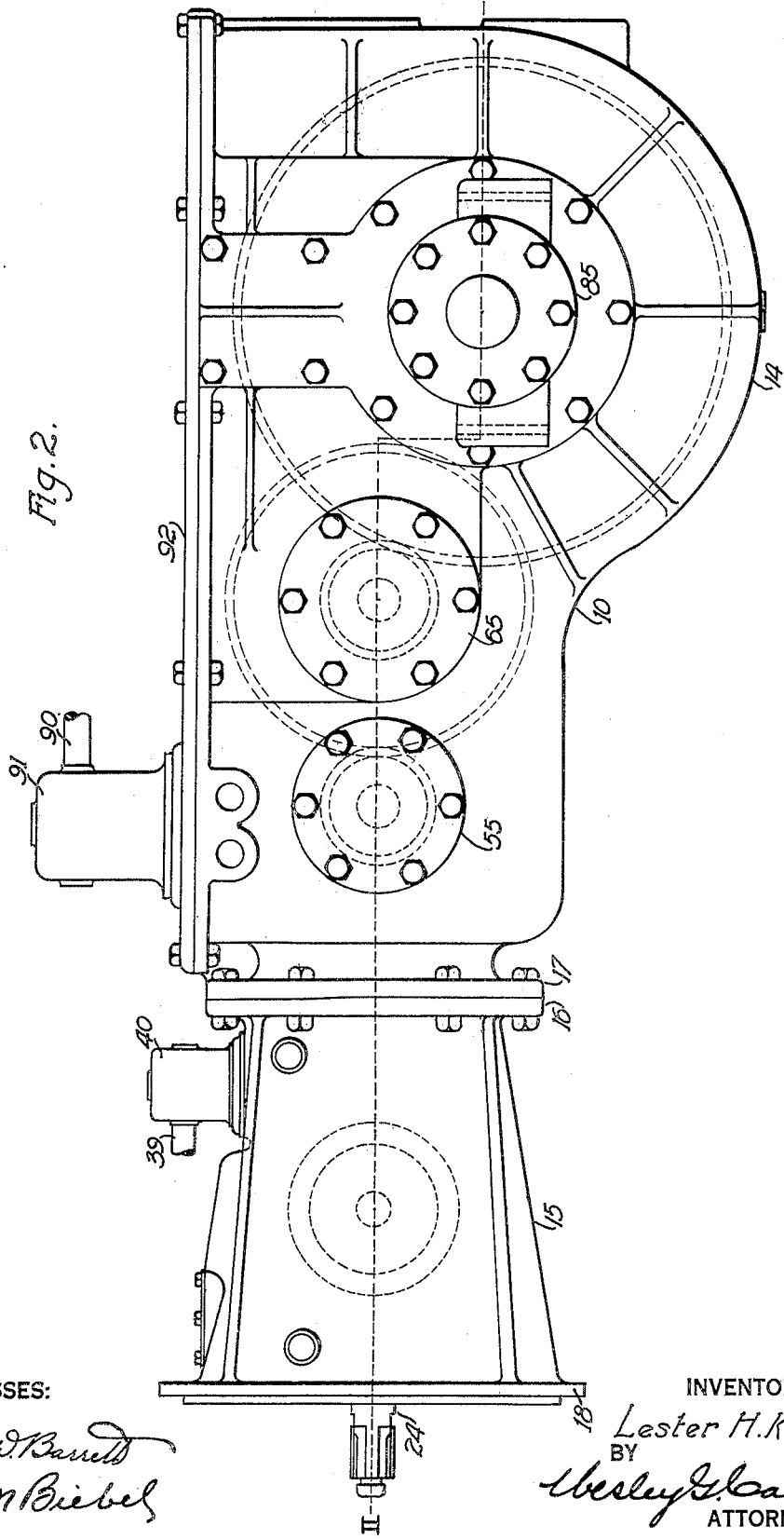

Patented Sept. 2, 1924.

1,506,755

UNITED STATES PATENT OFFICE.

LESTER H. KEIM, OF PITTSBURGH, PENNSYLVANIA, ASSIGNOR TO R. D. NUTTALL COMPANY, A CORPORATION OF PENNSYLVANIA.

TRANSMISSION MECHANISM.

Application filed July 15, 1919. Serial No. 311,002.

*To all whom it may concern:*

Be it known that I, LESTER H. KEIM, a citizen of the United States, and a resident of Pittsburgh, in the county of Allegheny and State of Pennsylvania, have invented a new and useful Improvement in Transmission Mechanisms, of which the following is a specification.

My invention relates to transmission mechanisms and particularly to devices for taking off power from such mechanisms.

One of the objects of my invention is to provide an independent power or pulley shaft that is adapted to be operatively connected or disconnected from the main transmission mechanism and in which the connecting and disconnecting mechanism and the power shaft itself are located in an enclosing housing that connects the engine to the gear case.

Another object of my invention is to so arrange the mounting of the driving and of the intermediate shaft that these shafts may have all the associated parts assembled thereon outside of the case and then the assembled units may be placed in position in the case.

In the two sheets of drawings, Figure 1 is a horizontal sectional view of the mechanism taken on the line II—II of Fig. 2, and Fig. 2 is a side elevation of the connecting housing and the gear case containing the mechanism, certain parts within the gear case being shown in broken lines.

The transmission mechanism comprises a combined change-speed transmission and differential gear case 10 which is substantially rectangular in transverse section and embodies side walls 11 and 12, an end wall 13 and a bottom wall 14. A connecting housing 15, also substantially rectangular in transverse section, is provided, at one end, with a flange 16 in order that it may be bolted to a co-operating flange 17 of the gear case 10, and is provided at its other end, with a flange 18 in order that it may be bolted to a co-operating part of a driving engine (not shown) with which it is to be associated. The connecting housing 15 has a transverse internal web 19 provided with a central opening 20 in which is mounted a suitable bearing 21. The flange 16 is provided with a central opening 22 in which is mounted a suitable bearing 23. A propeller shaft 24 is rotatably mounted in the bearings 21 and 23 and is provided with a bevel pinion 25 at its inner end which is secured to the shaft 24 by means of a nut 26 and a washer 27. A bearing collar 28 is secured to the shaft 24 by means of suitable lock nuts 29 and 30 and co-operates with the bearing 21, a dust cap 31 being provided to seal the connecting housing at that end. A bevel pinion 32 is rotatably mounted on the shaft 24 and is provided with an extended flange 33 on which is secured an oil throwing member 34 having a plurality of extended arms 34ª for dipping into the oil (not shown) in the lower part of the housing 15. The bevel pinion 32 is prevented from longitudinal movement on the shaft 24 by means of washers 35 and 36 which are suitably secured to the shaft 24.

The inner surface 37 of the flange 33 of the bevel pinion 32 is provided with a set of internal teeth to co-operate with a slidable member 38. The member 38 is splined on the shaft 24 and has corresponding teeth so that it may be moved into or out of mesh with the internal teeth on the surface 37 by means of the usual shifter fork (not shown) and a rod 39 which is slidable and rockable in a cap 40 fitted on the top of the connecting housing 15.

A circular opening 41 is provided in one side wall of the connecting housing 15, in which is mounted a sleeve 42 provided with a flange 43 to enable the sleeve 42 to be bolted around the opening 41. A bearing 44 is provided at the inner end of the sleeve 42, and a similar bearing 45 is provided at the outer end of the sleeve 42. A power shaft 46 is rotatably mounted in the bearings 44 and 45 and is provided with a bevel gear 47 mounted at its inner end and secured thereto by means of a nut 48 and a key 49. The bevel gear 47 is constantly in mesh with the bevel pinion 32 and may or may not be rotated thereby, depending on whether the member 38 is in engagement with the toothed flange 33 or not. A cover plate 50 is bolted to the outer end of sleeve 42 by a plurality of bolts 51. The exposed end of the shaft 46 is so arranged that a pulley (not shown) may be mounted thereon.

The bevel pinion 25 is constantly in mesh with a bevel gear wheel 52 keyed to a driving shaft 53 which is rotatably mounted, at its opposite ends, in bearings 54 in caps 55 secured over oppositely disposed openings 56 in the side walls 11 and 12 of the gear case 10. The shaft 53 has a low-speed spur pinion 57 and a high-speed spur pinion 58 slidably mounted thereon, which pinions are adapted to mesh with a low-speed gear wheel 59 and a high-speed gear wheel 60, respectively.

The low and high-speed pinions 57 and 58 are slidable axially on the shaft 53 by forked shifters (not shown) of the usual design, actuated by a rod 90 that is slidable and rockable in a cap 91 fitting over a suitable opening (not shown) in the cover 92 of the gear case 10. The rod 90 may be actuated by the operator by suitable connecting rods and levers (not shown) to move the desired pinion into mesh to obtain desired speed of the vehicle.

The gear wheels 59 and 60 are bolted together, on opposite sides of the rim of a spider 61, by bolts 62. The gear wheels 59 and 60 are carried by an intermediate shaft 63 mounted in bearings 64 in caps 65 secured over oppositely disposed openings 66 in the side walls 11 and 12 of the gear case 10. The spider 61 also carries a plurality of bevel pinions 67 that are rotatable about radial axes 68 mounted on the spider and that are in constant mesh with two differential and bevel gear elements 69 and 70 disposed co-axially with the spider 61. The elements 69 and 70 are similar and are mounted on sleeves 71 and 72 and keyed thereto. The outer ends of sleeves 71 and 72 are provided with toothed pinions 73 and 74. The sleeves 71 and 72 are mounted on inner sleeves 75 and 76 that are rotatably mounted on the shaft 63 on opposite sides of the spider 61 and the elements 69 and 70. The outer ends of the sleeves 73 and 74, and 75 and 76 terminate adjacent to washers 77.

The pinions 73 and 74 mesh with two large gear wheels 78 and 79, respectively, keyed to the inner ends of the rear axles 80 and 81, respectively. The axles 80 and 81 extend into the gear case 10 near the rear end thereof through oppositely disposed openings 82 in the side walls 11 and 12. The axles 80 and 81 are disposed parallel to the intermediate shaft 63 and the driving shaft 53 and transversely to the propeller shaft 24 and are surrounded, for part of their length, by sleeves 83 secured to the side walls 11 and 12 over the openings 82 therein. The sleeves 83 carry bearings 84 within their outer ends for rotatably supporting the outer ends of the shafts 80 and 81, suitable bearing caps 85 being provided to hold the bearings in place.

The gear wheels 78 and 79 are keyed to the axles 80 and 81, respectively, at a slight distance from the inner ends of the shafts to leave sufficient space between the gear wheels for supporting the axles at their inner ends. A bearing support 86 is cast integrally with the gear case 10 in the bottom thereof near the rear wall 13 and joined to said wall by a web 87 which reinforces the bearing support 86 against driving thrusts. The bearing support 86 carries suitable bearings 88 and 89 for rotatably supporting the inner ends of the axles 80 and 81, respectively. The gear case is partly filled with lubricant and, therefore, sufficient lubricating material will circulate through the bearing surfaces on the support 86 to properly lubricate the bearings. Tractor wheels (not shown) are mounted on the outer ends of the shafts 80 and 81.

The diameter of the opening 41 in the connecting housing 15 is made slightly greater than the diameter of the bevel gear 47 so that the shaft 46, the bearings 44 and 45, cap 50 and the bevel gear 47 may all be assembled in the sleeve 42 and properly adjusted before the sleeve is bolted to the housing 15.

The openings 56 and 66 are made sufficiently large so that all of the parts mounted on the shafts 53 and 63, respectively, may be assembled thereon before the shafts are placed in the gear case. In assembling the transmission, the shafts 80 and 81, with the gear wheels 78 and 79 mounted thereon, may be placed in position in the gear case and properly adjusted. Then the shafts 63 with the sleeves 75 and 76, sleeves 71 and pinions 73 and 74, gear wheels 59 and 60, spider 61, bevel gears 69 and 70, the bevel pinions 67 and pinions 68 may be lowered into the gear case 10 in a tilted position into the openings 66 until the pinions 73 and 74 mesh properly with the co-operating gear wheels 78 and 79, when the bearing caps 65, with the bearings 64 mounted therein, may be inserted and then bolted in place. The shaft 53 with the pinions 57 and 58, bevel gears 52 mounted thereon may then be lowered into the gear case in a tilted position into the openings 56 and the bevel gear 52 meshed with the bevel pinion 25 when the bearing caps 55, with the bearings 54 mounted therein, may be inserted and bolted in place.

In this way, the mounting of the various parts on the driving shaft 53 and on the intermediate shaft 63 is a relatively simple operation, as it may be performed before the two shafts are placed in the gear case. By making the circular openings 56 and 66 relatively large, the two shafts 53 and 63 with all of the parts carried by them may be tilted the small amount necessary to enable the gears and pinions to be properly meshed, thus making the final assembly of the transmission elements a relatively simple operation.

It will be noted also that I have provided a plurality of bearings for both the propeller shaft 24 and the power shaft 46 which will enable power to be transmitted with relatively small unbalanced stresses, with the power take off mounted in a housing intermediate between the engine and the gear case and thus forming an independent unit in each transmission mechanism.

While I have shown a specific application of my invention, it is to be understood that various modifications may be made therein without departing from the spirit and the scope of my invention, and I desire that only such limitations shall be placed thereon as are imposed by the prior art or are specifically set forth in the appended claims.

I claim as my invention:

1. In a tractor, a rear casing, a plurality of variable speed gear wheels mounted in said casing, an engine driven shaft, a gear wheel rotatably mounted thereon, an auxiliary shaft disposed perpendicular to said engine driven shaft having a gear wheel adapted to co-operate with said rotatably mounted wheel, a casing for housing said engine driven shaft and its co-operating gear wheels, said casing having a transverse partition for a bearing support and flanged ends for joining the same to the engine frame.

2. In a tractor, a rear casing, variable speed gearing mounted in said casing, a forward casing, an engine driven shaft in said forward casing having means for driving said variable speed gearing, a pulley loosely geared to said engine shaft, means for rendering said variable speed gearing inoperative and operatively connecting said engine shaft and pulley.

3. In a tractor, a rear casing, a pair of shafts rotatably mounted for rotation in said casing, variable speed gearing mounted in said casing in co-operative engagement with said shafts, a forward casing, an engine driven shaft in said forward casing, means associated with said last named shaft for driving said variable speed gearing, a pulley shaft geared to said engine driven shaft, means for rendering said variable speed gearing inoperative and means for operatively connecting said engine driven shaft and pulley shaft.

4. In a tractor, a rear casing, a pair of shafts rotatably mounted for rotation in said casing, variable speed gearing mounted in said casing in co-operative engagement with said shafts, a forward casing having a transverse partition and end flanges for joining the same with said rear casing and the engine frame, an engine driven shaft in said forward casing, means associated with said last named shaft for driving said variable speed gearing, a pulley shaft geared to said engine driven shaft, means for rendering said variable speed gearing inoperative and means for operatively connecting said engine driven shaft and pulley shaft.

In testimony whereof, I have hereunto subscribed my name this 8th day of July, 1919.

LESTER H. KEIM.